(12) United States Patent
Cheng et al.

(10) Patent No.: US 9,417,638 B2
(45) Date of Patent: Aug. 16, 2016

(54) INTELLIGENT THERMOSTATIC CONTROL METHOD AND DEVICE FOR AN AIR CONDITIONER BLOWING COLD AND HOT AIR

(71) Applicant: AUTOMOTIVE RESEARCH & TESTING CENTER, Lugang Chen, Changhua Hsien (TW)

(72) Inventors: Yen-Ting Cheng, Changhua Hsien (TW); Po-Hsu Lin, Changhua Hsien (TW)

(73) Assignee: AUTOMOTIVE RESEARCH & TESTING CENTER, Lugang Chen, Changhua Hsien (TW)

( * ) Notice: Subject to any disclaimer, the term of this patent is extended or adjusted under 35 U.S.C. 154(b) by 610 days.

(21) Appl. No.: 13/722,459

(22) Filed: Dec. 20, 2012

(65) Prior Publication Data

US 2014/0180483 A1 Jun. 26, 2014

(51) Int. Cl.
- *G05D 23/00* (2006.01)
- *G05D 23/19* (2006.01)
- *F24F 11/00* (2006.01)

(52) U.S. Cl.
CPC .......... *G05D 23/1931* (2013.01); *F24F 11/001* (2013.01); *F24F 11/0012* (2013.01); *F24F 2011/0013* (2013.01); *F24F 2011/0046* (2013.01); *F24F 2011/0049* (2013.01); *F24F 2011/0075* (2013.01); *F25B 2600/0253* (2013.01); *F25B 2700/151* (2013.01); *F25B 2700/1931* (2013.01); *F25B 2700/1933* (2013.01); *F25B 2700/2104* (2013.01); *F25B 2700/21151* (2013.01); *F25B 2700/21152* (2013.01); *F25B 2700/21162* (2013.01); *F25B 2700/21163* (2013.01); *F25B 2700/21174* (2013.01); *F25B 2700/21175* (2013.01); *Y02B 30/741* (2013.01)

(58) Field of Classification Search
None
See application file for complete search history.

(56) References Cited

U.S. PATENT DOCUMENTS

| | | | | | |
|---|---|---|---|---|---|
| 4,510,576 | A | * | 4/1985 | MacArthur | G01L 3/26 374/145 |
| 4,734,628 | A | * | 3/1988 | Bench et al. | 388/811 |
| 4,914,924 | A | * | 4/1990 | Takahashi | 62/133 |
| 4,930,698 | A | * | 6/1990 | Takekawa et al. | 236/49.3 |
| 4,951,475 | A | * | 8/1990 | Alsenz | 62/117 |
| 4,967,567 | A | * | 11/1990 | Proctor et al. | 62/127 |
| 5,117,643 | A | * | 6/1992 | Sakurai et al. | 62/133 |
| 5,203,179 | A | * | 4/1993 | Powell | 62/180 |
| 5,255,529 | A | * | 10/1993 | Powell et al. | 62/180 |
| 5,427,313 | A | * | 6/1995 | Davis et al. | 236/49.3 |
| 5,579,994 | A | * | 12/1996 | Davis et al. | 236/49.3 |
| 5,809,789 | A | * | 9/1998 | Baker et al. | 62/81 |

(Continued)

*Primary Examiner* — Christopher E Everett
(74) *Attorney, Agent, or Firm* — patenttm.us

(57) ABSTRACT

An intelligent thermostatic method for an air conditioner blowing cold and hot air has steps of calculating an estimated thermal load according to an indoor temperature, an outdoor temperature, a configured temperature, a sunlight intensity, and a cooling/heating capacity corresponding to the estimated thermal load; adjusting the air conditioner according to the estimated thermal load and providing an estimated cooling/heating capacity; and determining a difference value between an actual cooling/heating capacity and the estimated cooling/heating capacity and adjusting the air conditioner according to the difference value for thermostatic control. Accordingly, the air conditioner of the present invention has enhanced power utilization efficiency of the air conditioner without having to repeatedly turn on and off the electric compressor of the air conditioner.

13 Claims, 9 Drawing Sheets

(56) References Cited

U.S. PATENT DOCUMENTS

| | | | |
|---|---|---|---|
| 5,810,078 A * | 9/1998 | Knutsson et al. | 165/203 |
| 6,173,902 B1 * | 1/2001 | Bauer et al. | 236/49.3 |
| 6,202,934 B1 * | 3/2001 | Kamiya et al. | 236/91 C |
| 6,234,398 B1 * | 5/2001 | Pawlak et al. | 236/91 C |
| 6,888,120 B2 * | 5/2005 | Chiasson et al. | 250/203.4 |
| 6,966,498 B2 * | 11/2005 | Huang et al. | 236/91 C |
| 7,328,852 B2 * | 2/2008 | Paolillo et al. | 237/12.3 B |
| 7,513,439 B2 * | 4/2009 | Eisenhour | 236/49.3 |
| 7,530,234 B2 * | 5/2009 | Roehm | 62/179 |
| 7,578,341 B2 * | 8/2009 | Ichishi et al. | 165/202 |
| 7,590,499 B2 * | 9/2009 | Ha et al. | 702/60 |
| 8,813,831 B2 * | 8/2014 | Ripoll et al. | 165/41 |
| 8,839,632 B2 * | 9/2014 | Goenka et al. | 62/3.61 |
| 2001/0035286 A1 * | 11/2001 | Kobayashi et al. | 165/202 |
| 2002/0125334 A1 * | 9/2002 | Remond et al. | 236/91 C |
| 2005/0251364 A1 * | 11/2005 | Kang et al. | 702/183 |
| 2006/0032245 A1 * | 2/2006 | Kates | 62/129 |
| 2007/0000266 A1 * | 1/2007 | McEnaney et al. | 62/228.4 |
| 2007/0227168 A1 * | 10/2007 | Simmons | 62/229 |
| 2008/0028779 A1 * | 2/2008 | Song | 62/190 |
| 2009/0037142 A1 * | 2/2009 | Kates | 702/182 |
| 2009/0217679 A1 * | 9/2009 | Raghavachari | 62/77 |
| 2013/0025306 A1 * | 1/2013 | Matsukura et al. | 62/115 |
| 2013/0342142 A1 * | 12/2013 | Marcinkiewicz et al. | 318/400.11 |

* cited by examiner

INTELLIGENT THERMOSTATIC CONTROL METHOD AND DEVICE FOR AN AIR CONDITIONER BLOWING COLD AND HOT AIR

BACKGROUND OF THE INVENTION

1. Field of the Invention

The present invention relates to a thermostatic control device for an air conditioner and more particularly to an intelligent thermostatic control device capable of automatically maintaining a temperature of an air conditioner through a calculation using a comparison between a thermal load estimation and a desired cooling/heating capacity.

2. Description of the Related Art

Each conventional air conditioner has a compressor, a condenser, an expansion valve and an evaporator sequentially connected in series. The condenser has a cooling fan, and the evaporator has a blower. After leaving the compressor, refrigerant inside the air conditioner sequentially passes through the condenser, the expansion valve and the evaporator and returns to the compressor in completion of a cycle of heat absorption and heat dissipation for indoor temperature adjustment. The refrigerant absorbs heat from warm indoor air upon passing through the evaporator, and the heat carried with the refrigerant is blown to an outdoor environment to make the indoor temperature below the outdoor temperature. In the case of a vehicular air conditioner, the compressor of the air vehicular conditioner is driven by the engine. As the revolution per minute (RPM) of the engine fluctuates with the speed of the vehicle as a result of the road condition, the cooling capacity provided by the compressor is also dominated by the vehicle speed. In other words, when the vehicle speed is low, the refrigerant of the air conditioner flows slowly and the temperature inside the vehicle is not cool enough due to a slow cycle of heat absorption and heat dissipation. When the vehicle speed is high, the refrigerant of the air conditioner flows quickly and the temperature inside the vehicle is too cold due to a fast cycle of heat absorption and heat dissipation. Therefore, the uncontrollable temperature issue of the conventional air conditioners causes an unpleasant temperature condition to driver and passengers inside vehicles.

To tackle the issue, the compressor of the foregoing vehicular air conditioner is instead driven by an electric compressor with power supplied from the vehicle itself to keep rotation of the compressor stable and avoid the uncontrollable temperature condition arising from the fluctuating engine speed. However, the compressors of such type of conventional vehicular air conditioners are activated or deactivated through a conventional power on-off control. Suppose that conventional vehicular air conditioners of such type perform a thermostatic cooling operation inside vehicles. Their electric compressors have to be frequently turned on or off according to a temperature set by the air conditioner. Because of the power on-off control, the starting current and the operating power consume more power and overload the power systems of the vehicles, and such thermostatic control is therefore not as satisfactory as expected in terms of performance of air conditioner and energy conservation.

SUMMARY OF THE INVENTION

An objective of the present invention is to provide an intelligent thermostatic control method and device for an air conditioner blowing cold and hot air capable of adjusting a speed of an electric compressor of the air conditioner with thermal load estimation for providing an adequate cooling/heating capacity for thermostatic control and reducing power consumption of a vehicular power system.

To achieve the foregoing objective, the intelligent thermostatic control method has steps of:

calculating an estimated thermal load according to an indoor temperature, an outdoor temperature, a configured temperature, a sunlight intensity, and a cooling/heating capacity corresponding to the estimated thermal load;

adjusting the air conditioner according to the estimated thermal load and providing an estimated cooling/heating capacity; and determining a difference value between an actual cooling/heating capacity and the estimated cooling/heating capacity and adjusting the air conditioner according to the difference value for thermostatic control.

To achieve the foregoing objective, the air conditioner blowing cold and hot air has a compressor, a condenser, an expansion valve and an evaporator sequentially connected in series, and the intelligent thermostatic control device has a thermostatic controller, a sensor group and a configuration unit.

The thermostatic controller has a thermal load estimation module, a computation module and a control module.

The thermal load estimation module receives external signals to calculate an estimated thermal load and an estimated cooling/heating capacity corresponding to the estimated thermal load.

The computation module receives external signals to calculate an actual cooling/heating capacity.

The control module receives the estimated cooling/heating capacity from the thermal load estimation module, calculates a difference value between the actual cooling/heating capacity and the estimated cooling/heating capacity, and outputs a control signal to the air condition according to the difference value.

The sensor group is electrically connected to the thermostatic controller, has a sunlight intensity sensor, multiple temperature sensors and multiple pressure sensors for respectively detecting a sunlight intensity, temperature and pressure of the air conditioner and providing signals to the thermal load estimation module and the computation module.

The configuration unit is electrically connected to the thermostatic controller to configure a temperature and transmit a configured temperature signal to the thermostatic controller.

Given the foregoing intelligent thermostatic control device for an air conditioner blowing cold and hot air, the configuration unit transmits a desired indoor temperature signal to the thermostatic controller, the thermal load estimation module of the thermostatic controller calculates an estimated cooling/heating capacity corresponding to the estimated thermal load according to the indoor and outdoor temperatures detected by the temperature sensors, the sunlight intensity detected by the sunlight intensity sensor, the computation module receives the temperature and pressure of the electric compressor, the condenser and the evaporator to obtain an actual indoor cooling/heating capacity, and the control module then compares the estimated cooling/heating capacity and the actual cooling/heating capacity to obtain a difference value therebetween and sends a control signal to adjust the speed of the electric compressor, the cooling fan and the blower, thereby increasing the power utilization efficiency of the air conditioner and solving the overhead caused by more power consumed by conventional air conditioners to vehicular power systems.

DETAILED DESCRIPTION OF THE INVENTION

Figure 1:
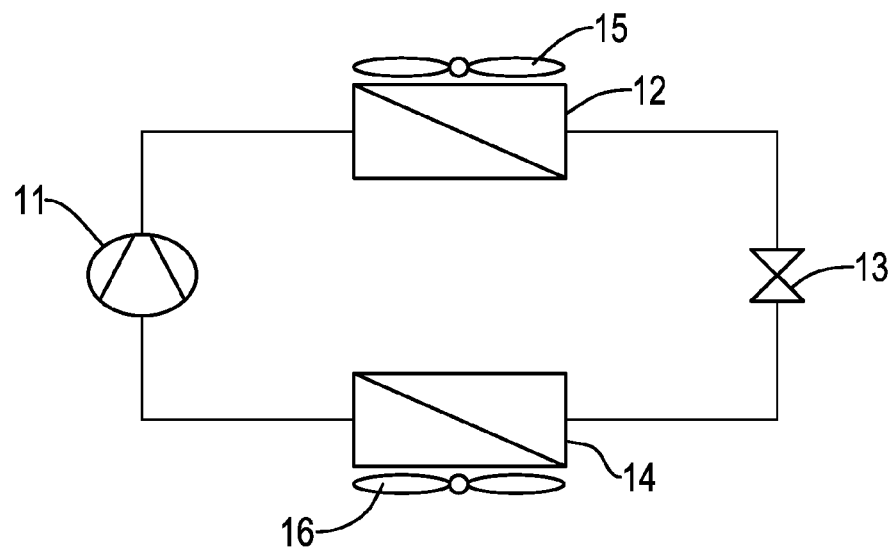
FIG. 1 is a system diagram of an embodiment of an air conditioner in accordance with the present invention.
Figure 2:
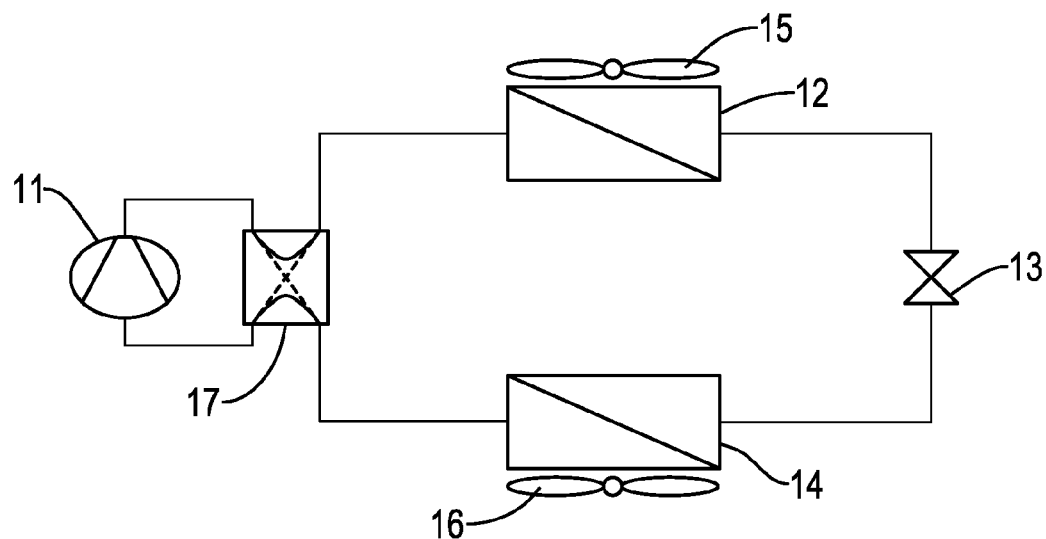
FIG. 2 is a system diagram of another embodiment of an air conditioner in accordance with the present invention.

With reference to FIG. 1, an embodiment of an air conditioner blowing cold and hot air in accordance with the present invention has an electric compressor 11, a condenser 12, an expansion valve 13 and an evaporator 14 sequentially connected in series. The condenser 12 has a cooling fan 15 mounted outside the condenser 12. The evaporator 14 has a blower 16 mounted outside the evaporator 14. Propelled by the electric compressor 11, refrigerant leaving the electric compressor 11 sequentially flows through the condenser 12, the expansion valve 13 and the evaporator 14 and returns to the electric compressor 11. Heat carried with the refrigerant is blown outdoors when the refrigerant passes through the condenser 12, and the refrigerant further passes through the evaporator 14 to absorb heat indoors, so that an indoor temperature is lower than an outdoor temperature. With reference to FIG. 2, another embodiment of the air conditioner blowing cold and hot air in accordance with the present invention is substantially the same as the foregoing embodiment except that a four-way reversing valve 17 is connected among the electric compressor 11, the condenser 12 and the evaporator 14. The four-way reversing valve 17 guides the refrigerant propelled by the electric compressor 11 to the condenser 12 or the evaporator 14 according to a control signal to change a flow direction of the refrigerant so as to achieve a same air conditioner capable of blowing cold/hot air.

Figure 3:
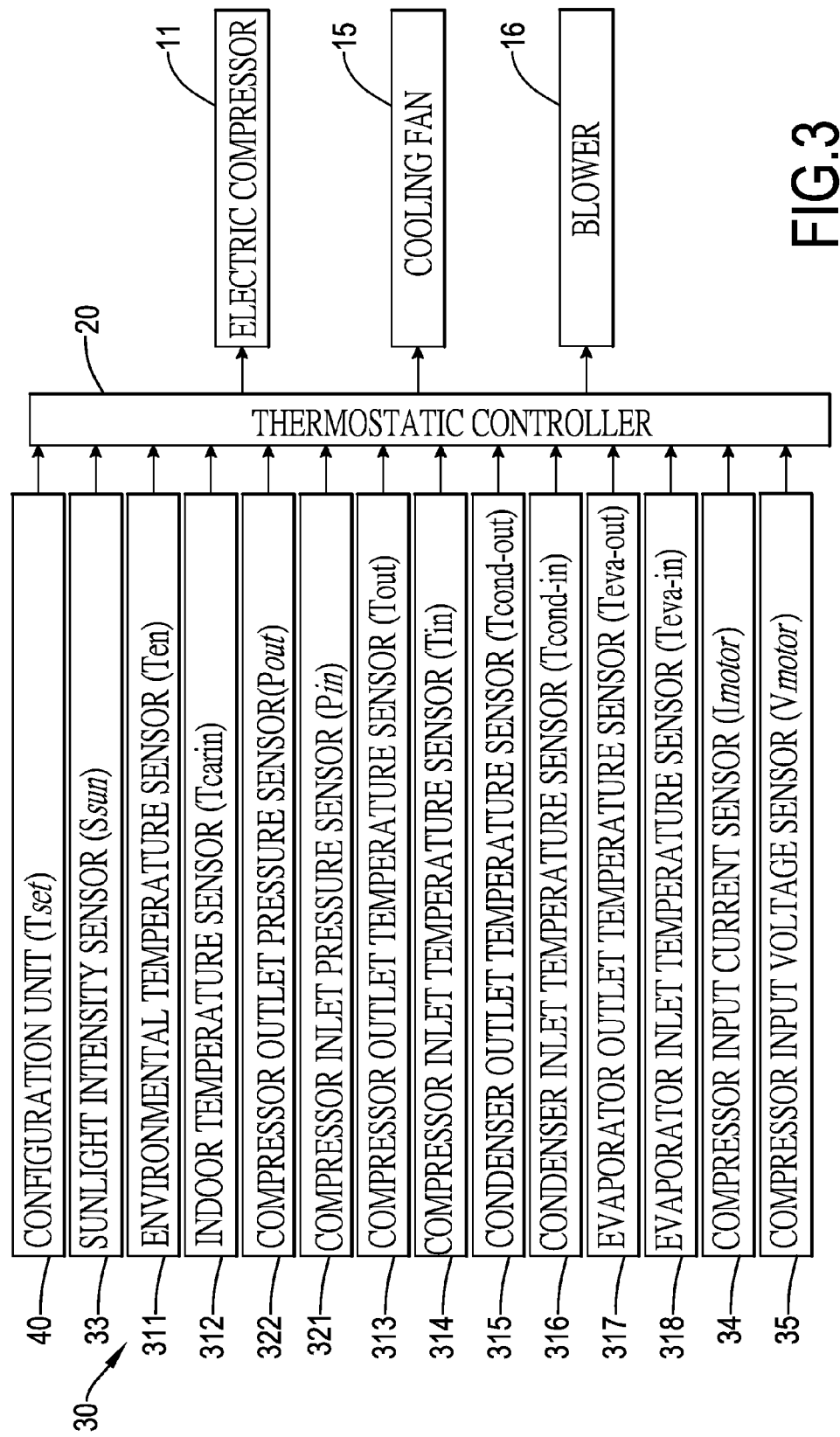
FIG. 3 is a functional block diagram of an intelligent thermostatic control device in accordance with the present invention.
Figure 4:
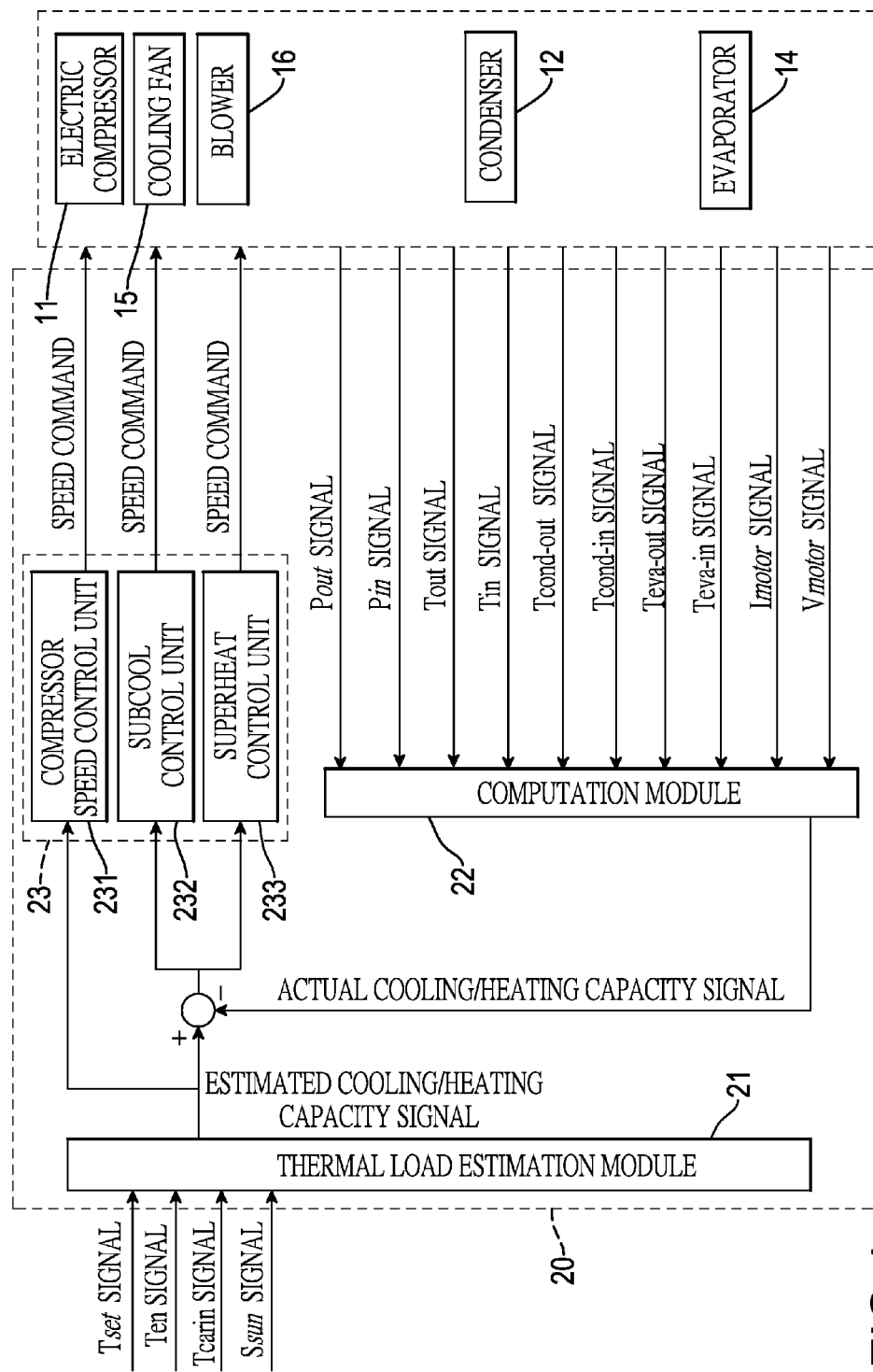
FIG. 4 is a control signal connection diagram of the intelligent thermostatic control device in FIG. 3.

With reference to FIG. 3, an intelligent thermostatic control device in accordance with the present invention is applied to a vehicle and has a sensor group 30, a thermostatic controller 20 and a configuration unit 40. The thermostatic controller 20 and the configuration unit 40 are electrically connected to the sensor group 30. The thermostatic controller 20 computes according to signals received from the sensor group 30 and the configuration unit 40 to respectively output control signals to the electric compressor 11, the cooling fan 15 and the blower 16 in the foregoing air conditioners.

The sensor group 30 serves to detect temperature and pressure of the electric compressor 11, the condenser 21 and the evaporator 14 and has multiple temperature sensors and multiple pressure sensors. In the present embodiment, the temperature sensors are an environmental temperature sensor ($T_{en}$) 311, an indoor temperature sensor ($T_{carin}$) 312, a compressor outlet temperature sensor ($T_{out}$) 313, an compressor inlet temperature sensor ($T_{in}$) 314, a condenser outlet temperature sensor ($T_{cond-out}$) 315, a condenser inlet temperature sensor ($T_{cond-in}$) 316, an evaporator outlet temperature sensor ($T_{eva-out}$) 317 and an evaporator inlet temperature sensor ($T_{eva-in}$) 318. The environmental temperature sensor ($T_{en}$) 311 serves to detect a temperature outside the vehicle. The indoor temperature sensor ($T_{carin}$) 312 serves to detect a temperature inside the vehicle. The compressor outlet temperature sensor ($T_{out}$) 313 serves to detect a temperature at the outlet of the electric compressor 11. The compressor inlet temperature sensor ($T_{in}$) 314 serves to detect a temperature at the inlet of the electric compressor 11. The condenser outlet temperature sensor ($T_{cond-out}$) 315 serves to detect a temperature at the outlet of the condenser 12. The condenser inlet temperature sensor ($T_{cond-in}$) 316 serves to detect a temperature at the inlet of the condenser 12. The evaporator outlet temperature sensor ($T_{eva-out}$) 317 serves to detect a temperature at the outlet of the evaporator 14. The evaporator outlet temperature sensor ($T_{eva-in}$) 318 serves to detect a temperature at the inlet of the evaporator 14. The pressure sensors are a compressor inlet pressure sensor ($P_{in}$) 321 and a compressor outlet pressure sensor ($P_{out}$) 322. The compressor inlet pressure sensor ($P_{in}$) 321 serves to detect a pressure at the inlet of the electric compressor 11. The compressor outlet pressure sensor ($P_{out}$) 322 serves to detect a pressure at the outlet of the electric compressor 11. The sensor group 30 further has a sunlight intensity sensor ($S_{sun}$) 33 serving to detect intensity of sunlight shining on the vehicle.

The thermostatic controller 20 has a thermal load estimation module 21, a computation module 22 and a control module 23. The thermal load estimation module 21 receives signals from the sensor group 30 and the configuration unit 40, and calculates a current estimated thermal load and an estimated cooling/heating capacity corresponding to the estimated thermal load according to a temperature inside a vehicle (indoor temperature), an environmental temperature (outdoor temperature), a configured temperature and the intensity of sunlight shining on the vehicle. The sunlight intensity needs to be taken into account when the estimated thermal load is calculated because the indoor temperature varies with the sunlight intensity.

The computation module 22 calculates an actual indoor cooling/heating capacity with feedback signals of temperature and pressure received from the electric compressor 11, the condenser 12 and the evaporator 14. The control module 23 receives the estimated cooling/heating capacity from the thermal load estimation module 21 and the actual indoor cooling/heating capacity from the computation module 22, and determines a cooling/heating capacity to be adjusted based on the difference between the estimated cooling/heating capacity and the actual indoor cooling/heating capacity in response to a superheat temperature or a subcool temperature of the air conditioner.

The control module 23 outputs control signals to the electric compressor 11, the cooling fan 15 and the blower 16 to adjust and maintain the temperature inside the vehicle within a configured temperature range, and has a compressor speed control unit 231, a subcool control unit 232 and a superheat control unit 233. The compressor speed control unit 231 is electrically connected to the electric compressor 11 to output a speed control signal to the electric compressor 11. The subcool control unit 232 is electrically connected to the cooling fan 15 to output a control signal to the cooling fan 15. The superheat control unit 233 is electrically connected to the blower 16 to output a control signal to the blower 16.

The configuration unit 40 serves for users to set a required indoor temperature and transmits a signal ($T_{set}$) associated with the indoor temperature to the thermostatic controller 20.

The thermostatic controller 20 is further connected to a compressor input current sensor ($I_{motor}$) 34 and a compressor input voltage sensor ($V_{motor}$) 35. The compressor input current sensor ($I_{motor}$) 34 and the compressor input voltage sensor ($V_{motor}$) 35 serve to respectively detect voltage and current consumed by the electric compressor 11.

The configuration unit 40 transmits the temperature signal ($T_{set}$) to the thermostatic controller 20. The thermal load estimation module 21 of the thermostatic controller 20 calculates the estimated thermal load inside the vehicle and the estimated cooling/heating capacity corresponding to the estimated thermal load according to the signals from the environmental temperature sensor ($T_{en}$) 311, the indoor temperature sensor ($T_{carin}$) 312 and the sunlight intensity sensor ($S_{sun}$) 33, and generates an estimated cooling/heating capacity signal. The computation module 22 receives the sensed temperature and pressure from each of the temperature sensors and the pressure sensors mounted on the electric compressor 11, the condenser 12 and the evaporator 14 to calculate an actual indoor cooling/heating capacity and generate an actual cooling/heating capacity signal. The control module 23 receives the estimated cooling/heating capacity signal and the actual cooling/heating capacity signal, obtains a difference value between the heating/cooling capacities representative of the estimated cooling/heating capacity signal and the actual cooling/heating capacity signal, and instructs the compressor speed control unit 231 to output a speed control signal to the electric compressor 11, the subcool control unit 232 to output a speed control signal to the cooling fan 15, and the superheat control unit 233 to output a speed control signal to the blower 16 according to the difference value. Hence, the control module 23 can adjust rotation speeds of the electric compressor 11, the cooling fan 15 and the blower 16 so that the actual cooling/heating capacity approaches the estimated cooling/heating capacity calculated by the thermal load estimation module 21.

Figure 5A:
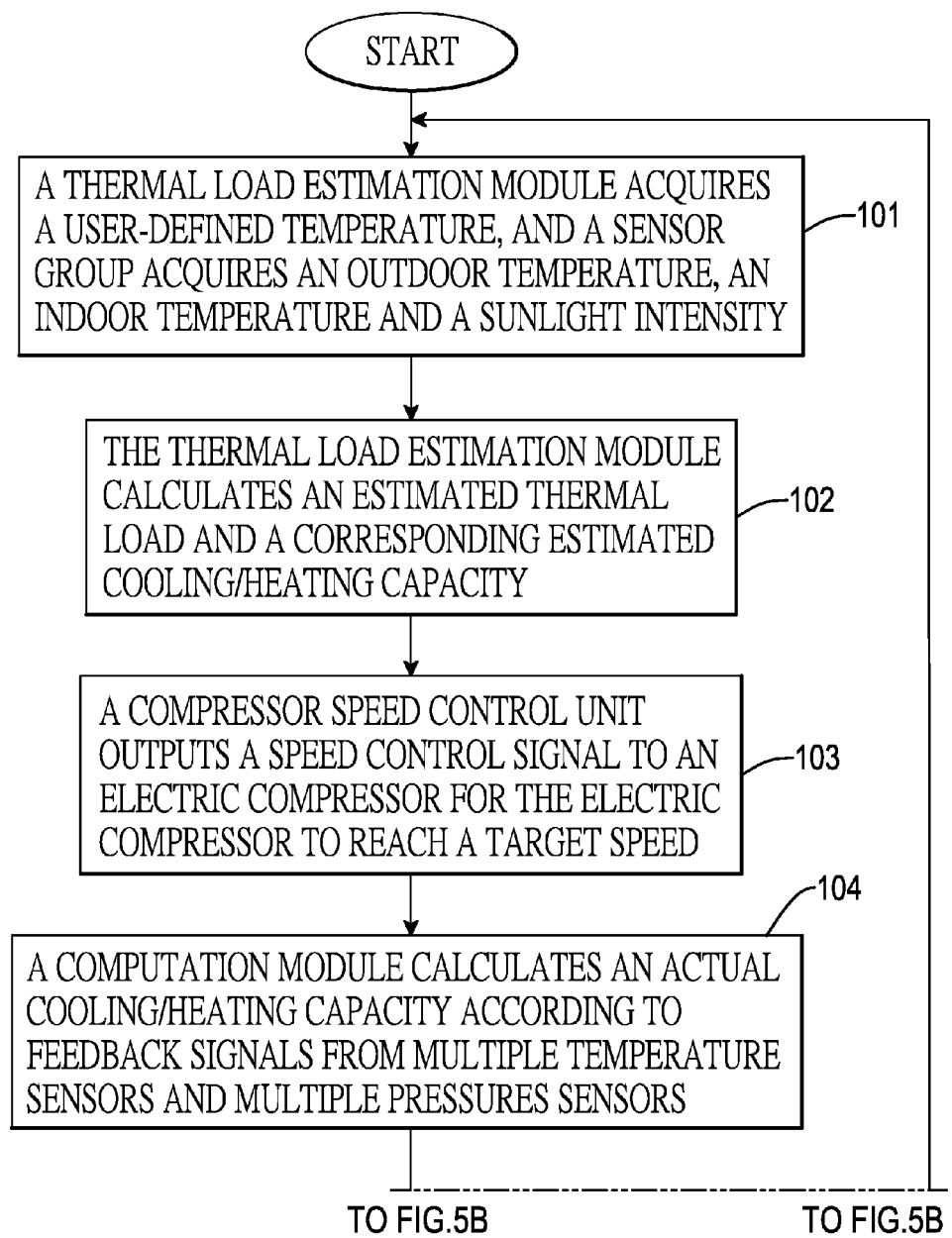
FIG. 5A is a flow diagram of an intelligent thermostatic control method in accordance with the present invention.
Figure 5B:
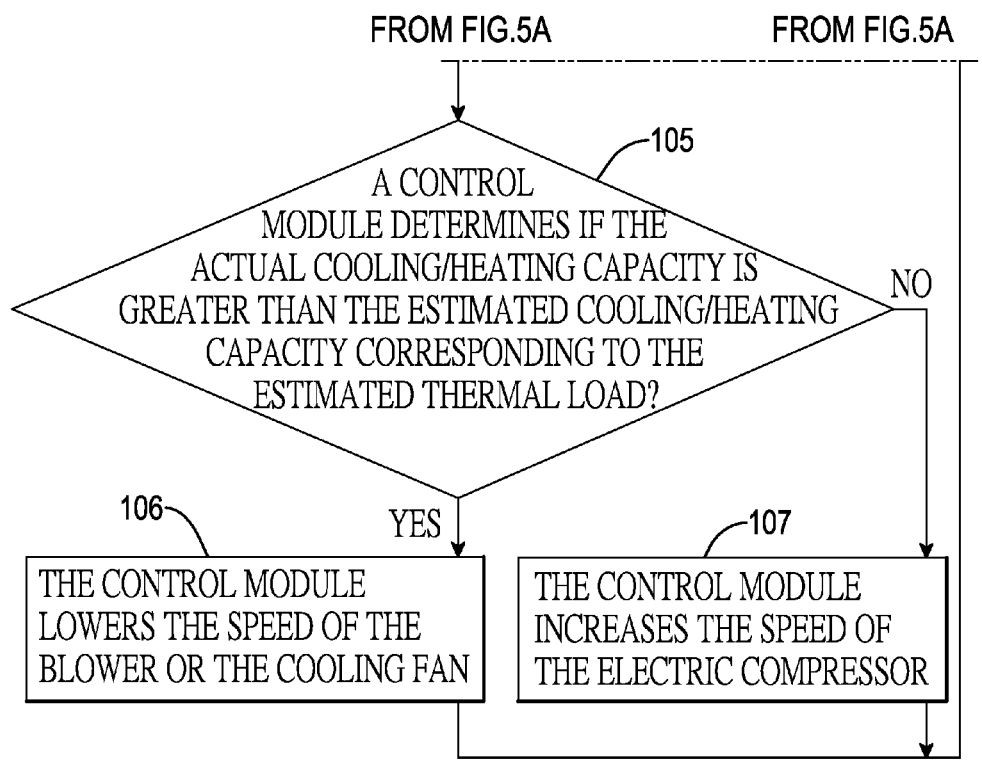
FIG. 5B is a flow diagram of the intelligent thermostatic control method in continuation with FIG. 5A.

With reference to FIGS. 5A and 5B, an intelligent thermostatic control method in accordance with the present invention has the following steps.

Step 101: A thermal load estimation module acquires a user-defined temperature, and a sensor group acquires an outdoor temperature, an indoor temperature and a sunlight intensity.

Step 102: The thermal load estimation module calculates an estimated thermal load and a corresponding estimated cooling/heating capacity.

Step 103: A compressor speed control unit outputs a speed control signal to an electric compressor for the electric compressor to reach a target speed.

Step 104: A computation module calculates an actual cooling/heating capacity according to feedback signals from multiple temperature sensors and multiple pressures sensors.

Step 105: A control module determines if the actual cooling/heating capacity is greater than the estimated cooling/heating capacity corresponding to the estimated thermal load.

Step 106: If positive or if it indicates a subcool/superheat condition indoors, the control module lowers the speed of the blower 16 or the cooling fan 15.

Step 107: If negative or if it indicates a superheat/subcool condition indoors, the control module increases the speed of the electric compressor.

Figure 6:
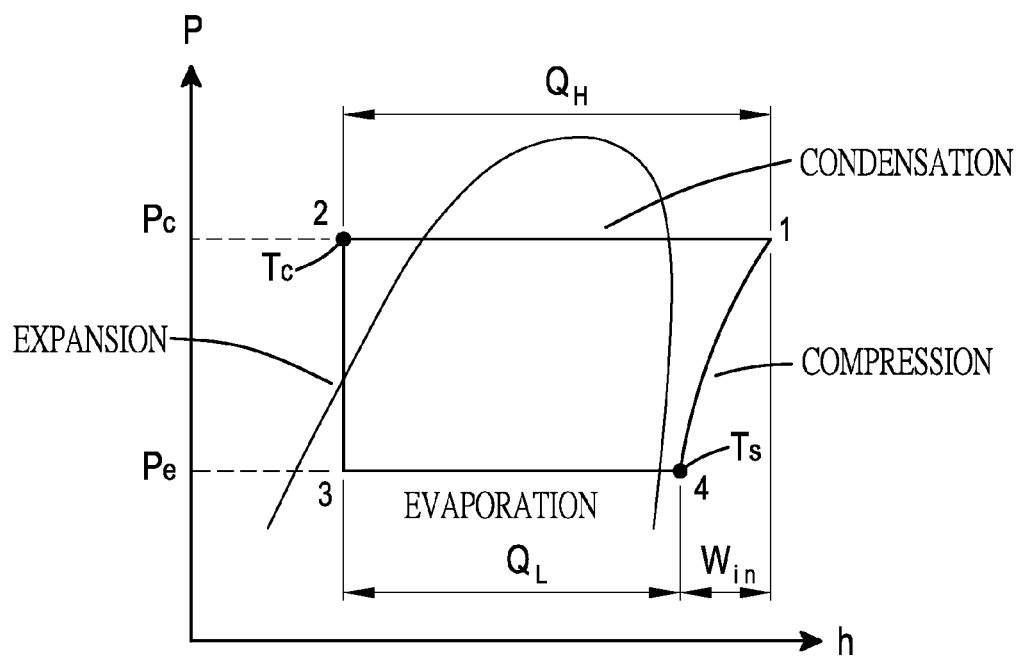
FIG. 6 is a pressure-enthalpy diagram of the air conditioner in FIG. 1 or FIG. 2.

With reference to FIG. 6, a pressure-enthalpy curve in association with the estimated indoor thermal load and the cooling/heating capacity corresponding to the estimated indoor thermal load is shown. A coefficient of performance for cooling $COP_L$ and a coefficient of performance for heating $COP_H$ are expressed as follows.

$$COP_L = \frac{Q_L}{W_{in}} = \frac{h_4 - h_3}{h_1 - h_4}$$

$$COP_H = \frac{Q_H}{W_{in}} = \frac{h_1 - h_2}{h_1 - h_4}$$

$$W_{in} = I\ motor \times V\ motor$$

Where
$W_{in}$: input power of electric compressor;
$Q_H$: heating capacity;
$Q_L$: cooling capacity;
h: enthalpy;
$T_S$: superheat temperature
$T_C$: subcool temperature Refrigerant in the air conditioner passes through processes of compression, condensation, expansion and evaporation to complete the cycles of heat absorption and heat dissipation.

Figure 7:
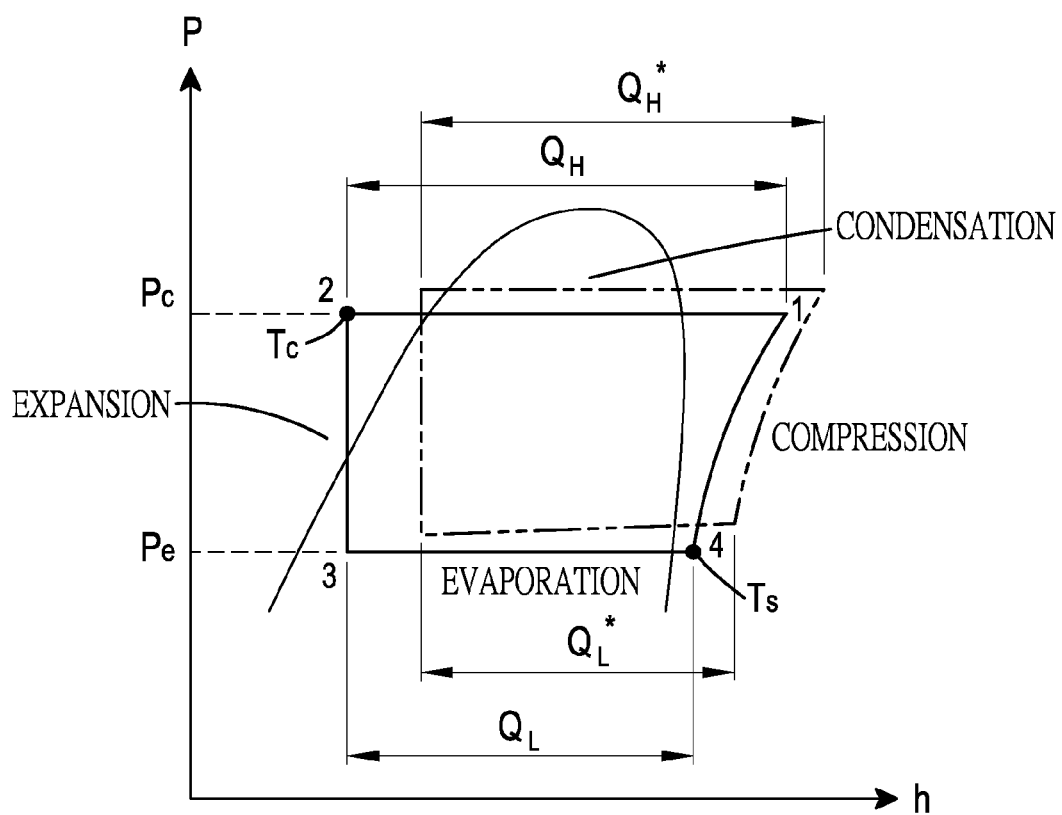
FIG. 7 is a pressure-enthalpy diagram of the air conditioner in FIG. 1 or FIG. 2 when an actual cooling/heating capacity is greater than a thermal load estimation value and the corresponding cooling/heating capacity is adjusted.

With reference to FIG. 7, when the actual cooling/heating capacity is greater than the estimated cooling/heating capacity corresponding to the estimated thermal load, it indicates a subcooling/superheating condition. Thus, the thermostatic controller 20 needs to lower the speed of the cooling fan 15 to adjust the superheat temperature and the subcool temperature. In response to the adjustment, the adjusted pressure-enthalpy curve marked by dot-dashed lines moves in an upper right direction so that $Q_L^* < Q_L$ and $Q_H^* < Q_H$, the actual cooling/heating capacity is lowered, and the actual cooling/heating capacity approaches the cooling/heating capacity corresponding to the estimated thermal load.

Figure 8:
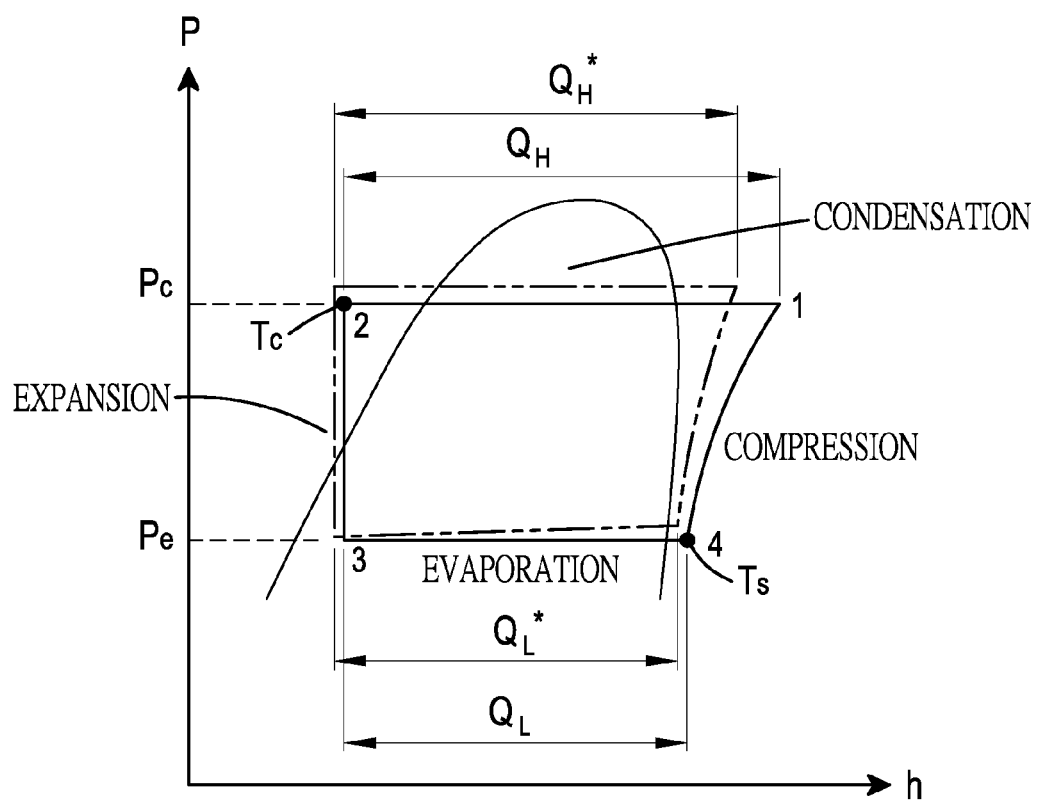
FIG. 8 is another pressure-enthalpy diagram of the air conditioner in FIG. 1 or FIG. 2 when an actual cooling/heating capacity is greater than a thermal load estimation value and the corresponding cooling/heating capacity is adjusted.

With reference to FIG. 8, when the actual heating capacity is greater than the estimated heating capacity corresponding to the estimated thermal load, it indicates a subcooling/superheating condition. Thus, the thermostatic controller 20 needs to lower the speed of the blower 16 to adjust the superheat temperature and the subcool temperature. In response to the adjustment, the adjusted pressure-enthalpy curve marked by dot-dashed lines moves in an upper left direction so that $Q_L^* < Q_L$ and $Q_H^* < Q_H$, the actual cooling/heating capacity is lowered, and the actual cooling/heating capacity approaches the cooling/heating capacity corresponding to the estimated thermal load.

Figure 9:
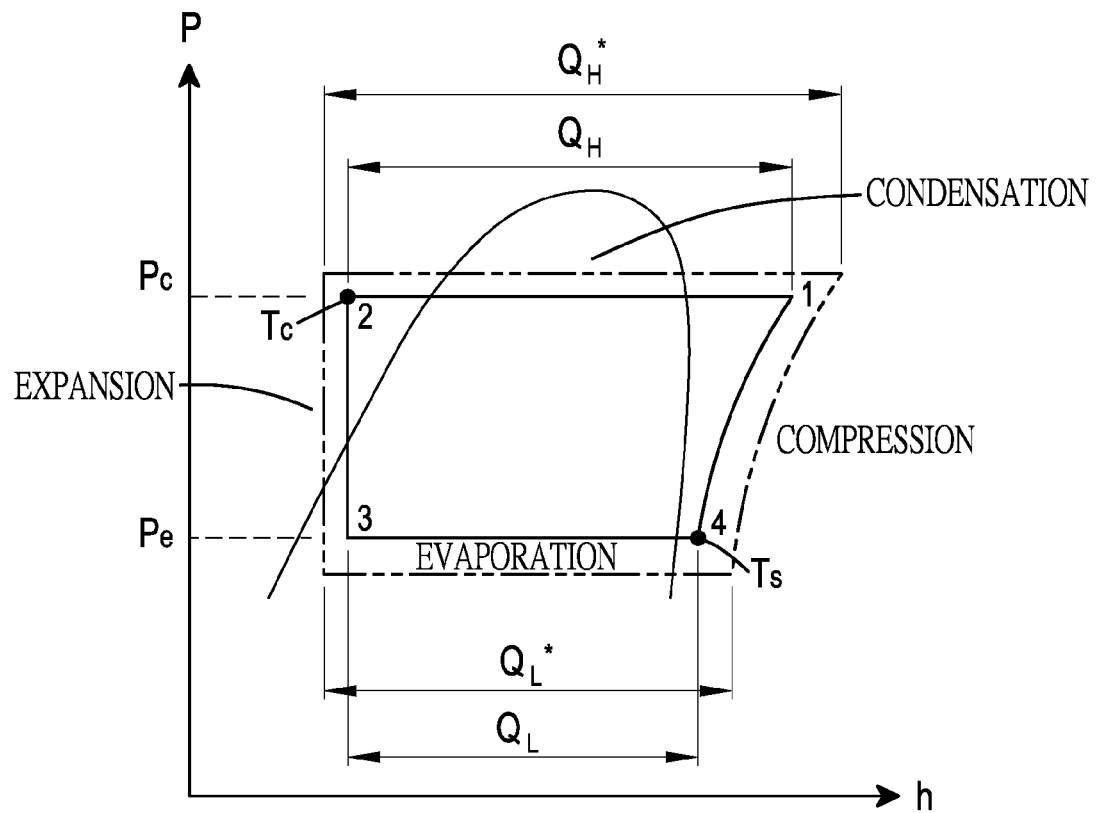
FIG. 9 is a pressure-enthalpy diagram of the air conditioner in FIG. 1 or FIG. 2 when an actual cooling/heating capacity is smaller than a thermal load estimation value and the corresponding cooling/heating capacity is adjusted.

With reference to FIG. 9, when the actual heating capacity is smaller than the estimated heating capacity corresponding to the estimated thermal load, it indicates a superheating/subcooling condition. Thus, the thermostatic controller 20 needs to increase the speed of the electric compressor 11 to adjust the subcool temperature and the superheat temperature. In response to the adjustment, the adjusted pressure-enthalpy curve marked by dot-dashed lines expands outwards so that $Q_L^*>Q_L$ and $Q_H^*>Q_H$, the actual cooling/heating capacity is increased, and the actual cooling/heating capacity approaches the cooling/heating capacity corresponding to the estimated thermal load.

In sum, the thermostatic controller 20 calculates an estimated thermal load inside a vehicle, obtains a cooling/heating capacity corresponding to the estimated thermal load, compares the estimated cooling/heating capacity with an actual cooling/heating capacity to acquire a difference value therebetween, and outputs corresponding control signals to all elements of an air conditioner, thereby enhancing an operational power efficiency of the air conditioner and solving the issue of conventional air conditioners consuming more power.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An intelligent thermostatic control method for an air conditioner blowing cold and hot air, wherein the air conditioner includes an electric compressor, a condenser, an expansion valve and an evaporator, the condenser has a cooling fan mounted outside the condenser and the evaporator has a blower mounted outside the evaporator, the method is performed by the air conditioner and comprises steps of:
    calculating an estimated thermal load according to an indoor temperature, an outdoor temperature, a configured temperature, and a sunlight intensity, and an estimated cooling/heating capacity corresponding to the estimated thermal load;
    adjusting the air conditioner according to the estimated thermal load and providing the estimated cooling/heating capacity;
    determining a difference value between an actual cooling/heating capacity and the estimated cooling/heating capacity and adjusting the air conditioner according to the difference value for thermostatic control, wherein the actual cooling/heating capacity is calculated according to an input power of the electric compressor and enthalpy values at the electric compressor, the condenser, the expansion valve and the evaporator of the air conditioner;
    lowering a speed of the blower of the evaporator or the cooling fan of the condenser for the actual cooling/heating capacity to approach the estimated cooling/heating capacity when the actual cooling/heating capacity is greater than the estimated cooling/heating capacity; and
    increasing the speed of the electric compressor for the actual cooling/heating capacity to approach the estimated cooling/heating capacity when the actual cooling/heating capacity is smaller than the estimated cooling/heating capacity.

2. An intelligent thermostatic control device for an air conditioner blowing cold and hot air and having an electric compressor, a condenser, an expansion valve and an evaporator sequentially connected in series, wherein the condenser has a cooling fan mounted outside the condenser and the evaporator has a blower mounted outside the evaporator, the intelligent thermostatic control device comprising:
    a thermostatic controller having:
        a thermal load estimation module receiving external signals to calculate an estimated thermal load and an estimated cooling/heating capacity corresponding to the estimated thermal load;
        a computation module receiving external signals to calculate an actual cooling/heating capacity according to an input power of the electric compressor and enthalpy values at the electric compressor, the condenser, the expansion valve and the evaporator of the air conditioner; and
        a control module receiving the estimated cooling/heating capacity from the thermal load estimation module, calculating a difference value between the actual cooling/heating capacity and the estimated cooling/heating capacity, and outputting a control signal to the air conditioner to lower a speed of the blower of the evaporator or the cooling fan of the condenser for the actual cooling/heating capacity to approach the estimated cooling/heating capacity when the actual cooling/heating capacity is greater than the estimated cooling/heating capacity and to increase a speed of the electric compressor for the actual cooling/heating capacity to approach the estimated cooling/heating capacity when the actual cooling/heating capacity is smaller than the estimated cooling/heating capacity;
    a sensor group electrically connected to the thermostatic controller, having a sunlight intensity sensor, multiple temperature sensors and multiple pressure sensors for respectively detecting a sunlight intensity, temperature and pressure of the air conditioner, and providing signals to the thermal load estimation module and the computation module; and
    a configuration unit electrically connected to the thermostatic controller to configure a temperature and transmit a configured temperature signal to the thermostatic controller.

3. The device as claimed in claim 2, wherein the temperature sensors have:
    an environmental temperature sensor serving to detect an outdoor temperature;
    an indoor temperature sensor serving to detect an indoor temperature;
    a compressor outlet temperature sensor serving to detect a temperature at the outlet of the electric compressor;
    an compressor inlet temperature sensor serving to detect a temperature at the inlet of the electric compressor;
    a condenser outlet temperature sensor serving to detect a temperature at the outlet of the condenser;
    a condenser inlet temperature sensor serving to detect a temperature at the inlet of the condenser;
    an evaporator outlet temperature sensor serving to detect a temperature at the outlet of the evaporator; and
    an evaporator inlet temperature sensor serving to detect a temperature at the inlet of the evaporator.

4. The device as claimed in claim 3, wherein the pressure sensors have:
    a compressor inlet pressure sensor serving to detect a pressure at the inlet of the electric compressor; and
    a compressor outlet pressure sensor serving to detect a pressure at the outlet of the electric compressor.

5. The device as claimed in claim 4, wherein the thermostatic controller is further connected to a compressor input current sensor and a compressor input voltage sensor, and the compressor input current sensor and the compressor input voltage sensor serve to respectively detect voltage and current consumed by the electric compressor.

6. The device as claimed in claim 4, wherein the control module has:
- a compressor speed control unit electrically connected to the electric compressor to output a speed control signal to the electric compressor;
- a subcool control unit electrically connected to the cooling fan of the condenser to output a control signal to the cooling fan; and
- a superheat control unit electrically connected to the blower of the evaporator to output a control signal to the blower.

7. The device as claimed in claim 3, wherein the thermostatic controller is further connected to a compressor input current sensor and a compressor input voltage sensor, and the compressor input current sensor and the compressor input voltage sensor serve to respectively detect voltage and current consumed by the electric compressor.

8. The device as claimed in claim 3, wherein the control module has:
- a compressor speed control unit electrically connected to the electric compressor to output a speed control signal to the electric compressor;
- a subcool control unit electrically connected to the cooling fan of the condenser to output a control signal to the cooling fan; and
- a superheat control unit electrically connected to the blower of the evaporator to output a control signal to the blower.

9. The device as claimed in claim 2, wherein the pressure sensors have:
- a compressor inlet pressure sensor serving to detect a pressure at the inlet of the electric compressor; and
- a compressor outlet pressure sensor serving to detect a pressure at the outlet of the electric compressor.

10. The device as claimed in claim 9, wherein the thermostatic controller is further connected to a compressor input current sensor and a compressor input voltage sensor, and the compressor input current sensor and the compressor input voltage sensor serve to respectively detect voltage and current consumed by the electric compressor.

11. The device as claimed in claim 9, wherein the control module has:
- a compressor speed control unit electrically connected to the electric compressor to output a speed control signal to the electric compressor;
- a subcool control unit electrically connected to the cooling fan of the condenser to output a control signal to the cooling fan; and
- a superheat control unit electrically connected to the blower of the evaporator to output a control signal to the blower.

12. The device as claimed in claim 2, wherein the thermostatic controller is further connected to a compressor input current sensor and a compressor input voltage sensor, and the compressor input current sensor and the compressor input voltage sensor serve to respectively detect voltage and current consumed by the electric compressor.

13. The device as claimed in claim 2, wherein the control module has:
- a compressor speed control unit electrically connected to the electric compressor to output a speed control signal to the electric compressor;
- a subcool control unit electrically connected to the cooling fan of the condenser to output a control signal to the cooling fan; and
- a superheat control unit electrically connected to the blower of the evaporator to output a control signal to the blower.

* * * * *